United States Patent
Zhang et al.

(10) Patent No.: US 10,841,761 B2
(45) Date of Patent: Nov. 17, 2020

(54) ADAPTIVE VEHICLE-TO-INFRASTRUCTURE COMMUNICATIONS

(71) Applicant: Ford Global Technologies, LLC, Dearborn, MI (US)

(72) Inventors: Linjun Zhang, Canton, MI (US); Helen Elizabeth Kourous-Harrigan, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 163 days.

(21) Appl. No.: 16/134,485

(22) Filed: Sep. 18, 2018

(65) Prior Publication Data
US 2020/0092693 A1 Mar. 19, 2020

(51) Int. Cl.
| | |
|---|---|
| *H04W 4/44* | (2018.01) |
| *G08G 1/0967* | (2006.01) |
| *G08G 1/01* | (2006.01) |
| *H04L 29/06* | (2006.01) |
| *H04W 28/06* | (2009.01) |
| *H04L 1/00* | (2006.01) |

(52) U.S. Cl.
CPC ............ *H04W 4/44* (2018.02); *G08G 1/0116* (2013.01); *G08G 1/0141* (2013.01); *G08G 1/096783* (2013.01); *H04L 1/0006* (2013.01); *H04L 69/04* (2013.01); *H04W 28/065* (2013.01)

(58) Field of Classification Search
CPC ....... H04W 4/44; H04W 28/065; H04W 4/02; G08G 1/0141; G08G 1/0116; G08G 1/096783; H04L 1/0006; H04L 69/04; H04L 2001/0093; H04L 67/12
See application file for complete search history.

(56) References Cited

U.S. PATENT DOCUMENTS

| | | | |
|---|---|---|---|
| 6,216,085 B1 * | 4/2001 | Emmerink | G01C 21/26 340/905 |
| 6,741,926 B1 * | 5/2004 | Zhao | G01C 21/3492 701/420 |
| 7,593,999 B2 | 9/2009 | Nathanson | |
| 8,520,673 B2 | 8/2013 | Chen et al. | |
| 2001/0010541 A1 * | 8/2001 | Fernandez | H04N 21/812 348/143 |
| 2003/0023375 A1 * | 1/2003 | Yoshida | G01C 21/3461 701/455 |
| 2003/0053433 A1 * | 3/2003 | Chun | H04L 12/66 370/338 |

(Continued)

FOREIGN PATENT DOCUMENTS

| | | |
|---|---|---|
| CN | 105578552 A | 5/2016 |
| CN | 102761404 B | 8/2017 |
| WO | 200353013 A2 | 6/2003 |

OTHER PUBLICATIONS

Kapsch Challenging Limits, "Connected Vehicles, V2X Technology", Kapsch TrafficCom AG (8 pages).

*Primary Examiner* — Babar Sarwar
(74) *Attorney, Agent, or Firm* — Frank A. MacKenzie; Bejin Bieneman PLC

(57) ABSTRACT

A map of an area can be generated describing an occupancy status for each of a plurality of sub-areas in the area. A first message including the map is transmitted. A second message is transmitted including an updated occupancy status for one or more of, and less than all, of the sub-areas.

19 Claims, 8 Drawing Sheets

(56) References Cited

U.S. PATENT DOCUMENTS

| | | | |
|---|---|---|---|
| 2009/0005962 A1* | 1/2009 | Shinto | G01C 21/3492 |
| | | | 701/532 |
| 2009/0287701 A1* | 11/2009 | Breaker | G06Q 50/30 |
| 2010/0020169 A1* | 1/2010 | Jang | G08G 1/0962 |
| | | | 348/115 |
| 2012/0101728 A1* | 4/2012 | Kudo | G01C 21/3461 |
| | | | 701/540 |
| 2012/0316775 A1* | 12/2012 | Hayashi | G01C 21/3658 |
| | | | 701/423 |
| 2014/0025292 A1* | 1/2014 | Stahlin | G08G 1/0129 |
| | | | 701/461 |
| 2014/0095510 A1* | 4/2014 | Lv | G06F 16/95 |
| | | | 707/740 |
| 2015/0057891 A1* | 2/2015 | Mudalige | B60W 10/18 |
| | | | 701/42 |
| 2016/0294493 A2* | 10/2016 | Daoura | H04H 20/59 |
| 2017/0068687 A1* | 3/2017 | Konstantinov | G06F 16/29 |
| 2017/0324817 A1 | 11/2017 | Oliveira et al. | |
| 2019/0088148 A1* | 3/2019 | Jacobus | B60W 10/18 |
| 2019/0268741 A1* | 8/2019 | Shen | H04W 72/1242 |
| 2019/0306729 A1* | 10/2019 | Lopes | H04L 67/125 |
| 2020/0092685 A1* | 3/2020 | Fehrenbach | H04B 7/15507 |

* cited by examiner

US 10,841,761 B2

ADAPTIVE VEHICLE-TO-INFRASTRUCTURE COMMUNICATIONS

BACKGROUND

Vehicle-to-infrastructure (V2I) communications can allow an infrastructure element installed proximate to a road to provide data to vehicles in an area proximate to the infrastructure element. For example, the infrastructure element may be able to provide data about objects, hazards, etc., in the area to support a vehicle's path planning, e.g., avoidance of hazards and objects. However, the infrastructure element may have limited bandwidth and/or a limited payload per packet in which to transmit data to vehicles. Further, data compression techniques available for a roadside infrastructure elements are typically lossy, i.e., result is a loss of data and/or a degraded resolution of data provided by the infrastructure element.

DETAILED DESCRIPTION

Introduction

Figure 1:
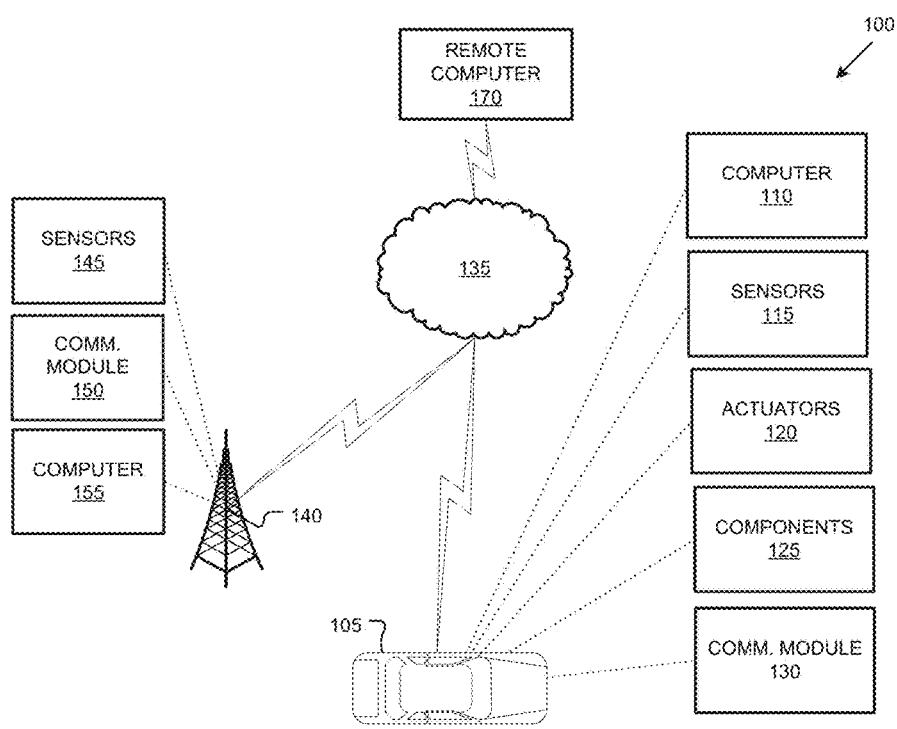
FIG. 1 is a diagram illustrating an example infrastructure communications and control system.

A method, comprises generating a map of an area describing an occupancy status for each of a plurality of sub-areas in the area; transmitting a first message including the map; and transmitting a second message including an updated occupancy status for one or more of, and less than all, of the sub-areas. The method can further comprise serializing the map to provide a payload for the first message. The area can be defined by a field of view of a sensor on a stationary infrastructure element, and the map can be generated from data from the sensor. The method can further comprise excluding a sub-area from the map based on expected paths of travel of vehicles in the area. The computer and the sensor can be fixed to the infrastructure element. The second message can include data specifying a location in the first message for replacing a portion of the first message. The occupancy status can be specified by an occupancy box that includes coordinates describing a shape of the occupancy box. The occupancy status can be specified by a description of an object, including coordinates of the object and a motion status of the object. The method can further comprise determining to transmit the second message according to a priority assigned to updating the occupancy status of at least one of the plurality of sub-areas.

A computer can comprise a processor and a memory, and the memory can store instructions executable by the processor for receiving a first message including a map of an area describing an occupancy status for each of a plurality of sub-areas in the area; receiving a first message including the map; and receiving a second message, and determining that the second message includes one of a new map of the area and an updated occupancy status for one or more of, and less than all, of the sub-areas.

A system can comprise a computer including a processor and a memory, the memory storing instructions executable by the processor for generating a map of an area describing an occupancy status for each of a plurality of sub-areas in the area; transmitting a first message including the map; and transmitting a second message including an updated occupancy status for one or more of, and less than all, of the sub-areas. The instructions can further include instructions for serializing the map to provide a payload for the first message. The area can be defined by a field of view of a sensor on a stationary infrastructure element, and the map can be generated from data from the sensor. The instructions can further include instructions for excluding a sub-area from the map based on expected paths of travel of vehicles in the area. The system can further comprise the stationary infrastructure element, wherein the computer and the sensor are fixed to the infrastructure element. The second message can include data specifying a location in the first message for replacing a portion of the first message. The occupancy status can be specified by an occupancy box that includes coordinates describing a shape of the occupancy box. The occupancy status can be specified by a description of an object, including coordinates of the object and a motion status of the object. The instructions can further include instructions for determining to transmit the second message according to a priority assigned to updating the occupancy status of at least one of the plurality of sub-areas.

Exemplary System Elements

FIG. 1 is a block diagram of an example infrastructure communications and control system (or infrastructure system) 100. An infrastructure element 140 can include a computer 155 programmed to generate an area map, i.e., a map that specifies contents of respective sub-areas in an area proximate to the infrastructure element 140. The computer 155 can transmit the area map via a communications module 150 to one or more vehicles 105 in the area proximate to the infrastructure element 140. Transmission of a packetized message including the area map can consume significant bandwidth. Advantageously, when data in the area map changes or needs to be updated, the computer 155 can transmit a new message that provides a subset of the packetized message that originally transmitted the entire area map, e.g., the new message may pertain only to one or more sub-areas and/or one or more objects (e.g., via merged occupancy boxes, as described below) in the area map for which updating is warranted. The computer 155 can thus provide timely and accurate information to promote safe and efficient vehicle 105 operation while at the same time making efficient use of available bandwidth.

The system 100 an infrastructure element 140 that can provide data to one or more vehicles 105, typically (but not necessarily) a land vehicle such as a car, truck, etc. Additionally or alternatively, a vehicle 105 may include a bicycle, a motorcycle, etc. A vehicle 105 includes a vehicle computer 110, sensors 115, actuators 120 to actuate various vehicle components 125, and a vehicle communications module 130. Via a network 135, the communications module 130 allows the vehicle computer 110 to communicate with one or more infrastructure elements 140 and a central server 170.

A vehicle computer 110 includes a processor and a memory such as are known. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 network such as a communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 105 network, the computer 110 may transmit messages to various devices in the vehicle and/or receive messages (e.g., CAN messages) from the various devices, e.g., sensors 115, an actuator 120, an human machine interface (HMI), etc. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to an infrastructure element 140 (typically via direct radio frequency communications) and/or (typically via the network 135) a remote server 170. The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 105 may communicate with an infrastructure element 140 and/or central server 170. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure element 140 includes a physical structure such as a tower or other support structure (e.g., a pole, a box mountable to a bridge support, cell phone tower, road sign support, etc.) on or in which infrastructure sensors 145, as well as an infrastructure communications module 150 and computer 155 can be housed, mounted, stored, and/or contained, and powered, etc. One infrastructure element 140 is shown in FIG. 1 for ease of illustration, but the system 100 could and likely would include tens, hundreds, or thousands of elements 140.

An infrastructure element 140 is typically stationary, i.e., fixed to and not able to move from a specific physical location. The infrastructure sensors 145 may include one or more sensors such as described above for the vehicle 105 sensors 115, e.g., LIDAR, radar, cameras, ultrasonic sensors, etc. The infrastructure sensors 145 are fixed or stationary. That is, each sensor 145 is mounted to the infrastructure element so as to have a substantially unmoving and unchanging field of view.

Sensors 145 thus provide field of views in contrast to vehicle 105 sensors 115 in a number of advantageous respects. First, because sensors 145 have a substantially constant field of view, determinations of vehicle 105 and object locations can be accomplished with fewer and simpler processing resources than if movement of the sensors 145 also had to be accounted for. Further, the sensors 145 include an external perspective of the vehicle 145 and can sometimes detect features and characteristics of objects not in the vehicle 105 sensors 115 field(s) of view and/or can provide more accurate detection, e.g., with respect to vehicle 105 location and/or movement with respect to other objects. Yet further, sensors 145 can communicate with the element 140 computer 155 via a wired connection, whereas vehicles 105 typically can communicates with elements 140 and/or a server 170 only wirelessly, or only at very limited times when a wired connection is available. Wired communications are more reliable and can be faster than wireless communications such as vehicle-to-infrastructure communications or the like.

The communications module 150 and computer 155 typically have features in common with the vehicle computer 110 and vehicle communications module 130, and therefore will not be described further to avoid redundancy. Although not shown for ease of illustration, the infrastructure element 140 also includes a power source such as a battery, solar power cells, and/or a connection to a power grid.

The server 170 can be a conventional computing device, i.e., including one or more processors and one or more memories, programmed to provide operations such as disclosed herein. Further, the server 170 can be accessed via the network 135, e.g., the Internet or some other wide area network.

Figure 2:
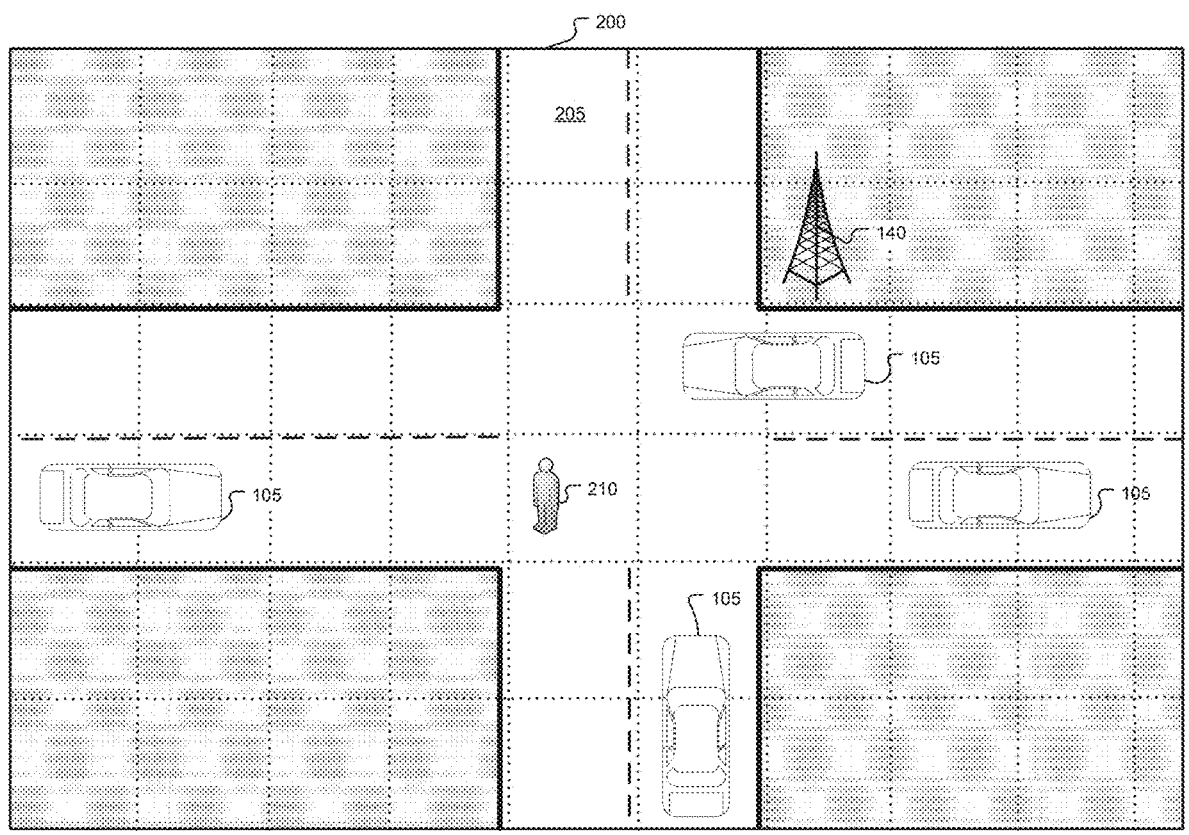
FIG. 2 is a block diagram illustrating an example area proximate to an infrastructure element.

Turning to FIG. 2, an infrastructure element 140 can be provided to monitor defined area 200 around the infrastructure element 140. For example, the defined area 200 could be an area that is proximate to the infrastructure element 140. In the present context, "proximate" means that the area 200 is defined by a field of view of one or more element 140 sensors 145. The defined area 200 could alternatively be an area defined by a radius around the element 140 or some other distance or set of distances relative to the infrastructure element 140.

The area 200 includes a plurality of sub-areas 205. To avoid an unwieldy illustration, the reference number 205 is shown once in FIG. 2. However, it is to be understood that the crisscrossing or perpendicular dotted lines represent boundaries of respective sub-areas 205, i.e., each square or rectangle formed by the dotted lines in FIG. 2 represents a sub-area 205. Typically sub-areas 205 that cover a road or possible path of travel of a vehicle 105 are of interest, whereas other sub-areas 205 are not. Accordingly, an area map could omit sub-areas 205 shown as shaded in FIG. 2, i.e., areas 205 not intended for a planned path of travel of a vehicle 105.

In addition to vehicles 105, an area 200 can include various objects or hazards 210. Although only a pedestrian object 210 is shown for simplicity of illustration, an area 200 could alternatively or additionally include many other objects or hazards 210, e.g., bumps, potholes, bicyclists, curbs or berms, etc. For example, as discussed with respect to FIG. 5 below, barriers 300, e.g., placed on a road undergoing construction or repair, could be objects included on an area map.

The area map can be rendered in a variety of ways. In an example used herein, the area map specifies, e.g., according to a Cartesian coordinate system or the like, coordinates for each sub-area 205 in the area 200. The map further specifies, for each sub-area 205, and occupancy status, e.g., hazard or object present or not present. Additionally, the area map could specify characteristics of a hazard or object in a sub-area 205, e.g., a height, a width, etc.

The computer 155 can receive various data from the element 140 sensors 145 to generate the area map. Such data can include image data, i.e., a digital image data, e.g., comprising pixels with intensity and color values, acquired by a camera sensors 145. The computer 155 can also receive LIDAR data that includes conventional LIDAR point cloud data acquired by lidar sensors 145, i.e., including data describing points in three dimensions. Various techniques are known for determining that sub-areas 205 are occupied or not occupied by hazards or objects and/or determining characteristics of hazards and/or objects, such as a height, a width, identification of an object (e.g., bicycle, pedestrian, speedbump, pothole, etc.), etc.

The computer 155 can be programmed to serialize, i.e., convert to a string of bits, area map data, so that the area map can be included in a message comprising packets that include the serialized data (or, in each of a plurality of packets, a portion thereof) as a payload, the message being transmitted to vehicles 105.

Figure 3:
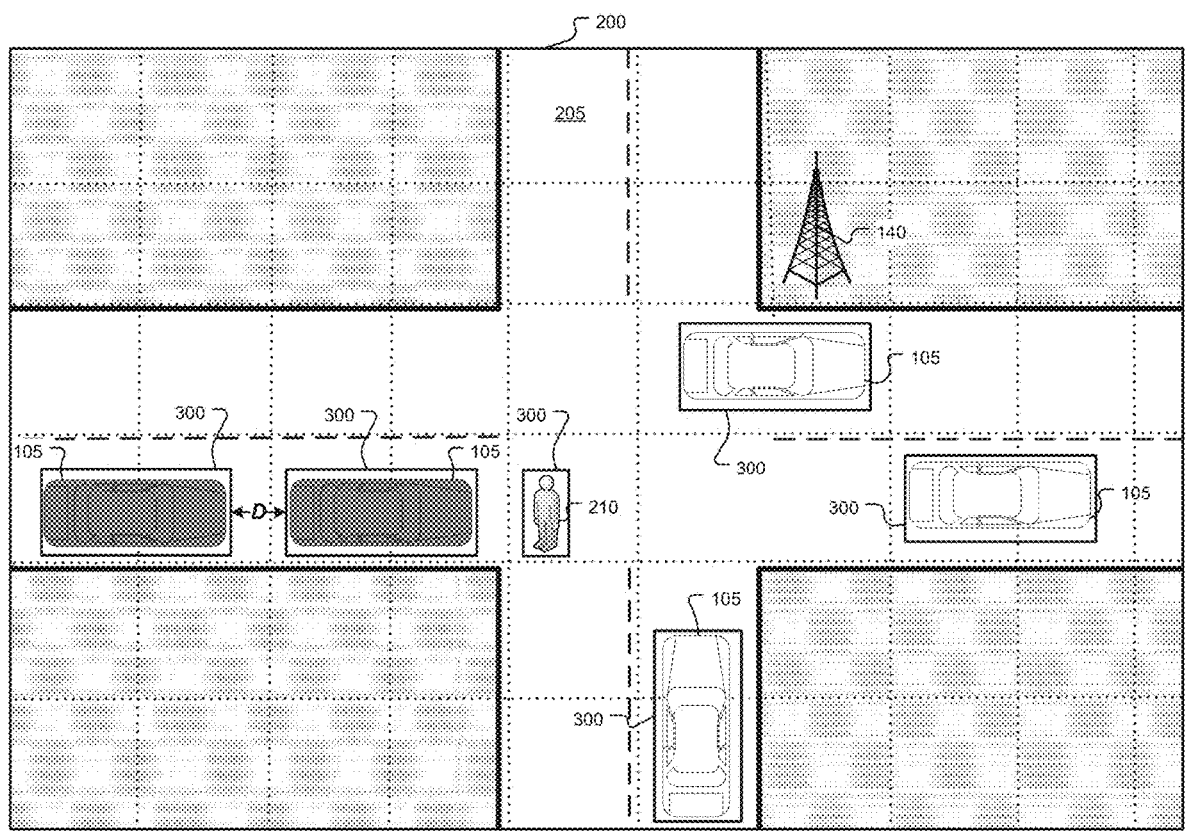
FIG. 3 is a block diagram illustrating an example area proximate to an infrastructure element including occupancy boxes around objects.

FIG. 3 is a block diagram illustrating an example area 200 proximate to an infrastructure element 140 including occupancy boxes 300 around objects 105, 210. Object detection and classification algorithms typically have the ability to classify objects as one of regularly or irregularly shaped. Many objects, e.g., vehicles 105, can be classified as regularly shaped and then indicated on an area map with an occupancy box 300. Note that in the top-down view of the present figures, the occupancy box 300 is shown as rectangular, but that an object detection and classification algorithm would initially interpret three-dimensional data that could then be reduced to two dimensions as shown herein. That is, a vehicle 105 has a generally regular shape that can be fitted to a rectangular solid, and then shown as a two-dimensional rectangle as seen in the present figures. Thus, the occupancy box 300 allows for objects to be more efficiently represented on an area map because the occupancy box 300 can specify coordinates for a regular shape along with an indication that the area within the coordinates should be regarded as an occupied area on the area map. A vehicle 105 can then use the occupancy box 300 to plan a path, i.e., an occupied area indicated by an occupancy box 300 should not be included in a vehicle 105 path because of a risk of collision.

Figure 4:
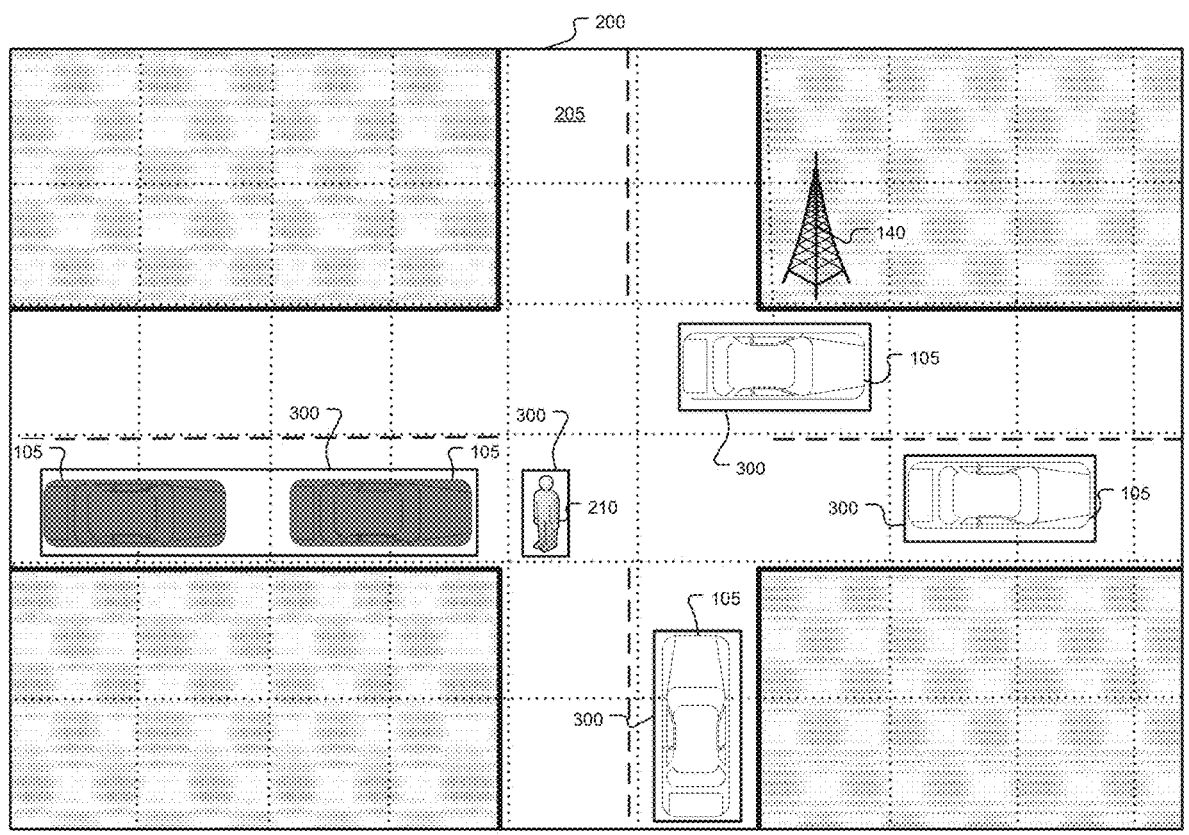
FIG. 4 is a block diagram illustrating an example area proximate to an infrastructure element including a merged occupancy box around objects.

FIG. 3 further illustrates, with respect to the vehicles 105 that are shaded, that the computer 155 can determine a distance D between two objects, e.g., between vehicles 105. For example, the shaded vehicles 105 could be parked or moving below a threshold speed, e.g., 10 kilometers per hour, whereupon the computer 105 could determine the distance D. The computer 155 can use the distance D to determine to merged occupancy boxes 300 around respective objects such as vehicles 105. That is, if the distance D between occupancy boxes 300 is below a predetermined threshold, e.g., a distance determined according to a space or area too small for a vehicle 105 to navigate within, then the computer 155 can determine to merge the occupancy boxes 300. For example, the distance D shown in FIG. 3 would be too small for another vehicle 105 to navigate within. Thus, as seen in FIG. 4 an example area 200 can include a merged occupancy box 300 around two or more objects, in this example, the shaded vehicles 105.

Figure 5:
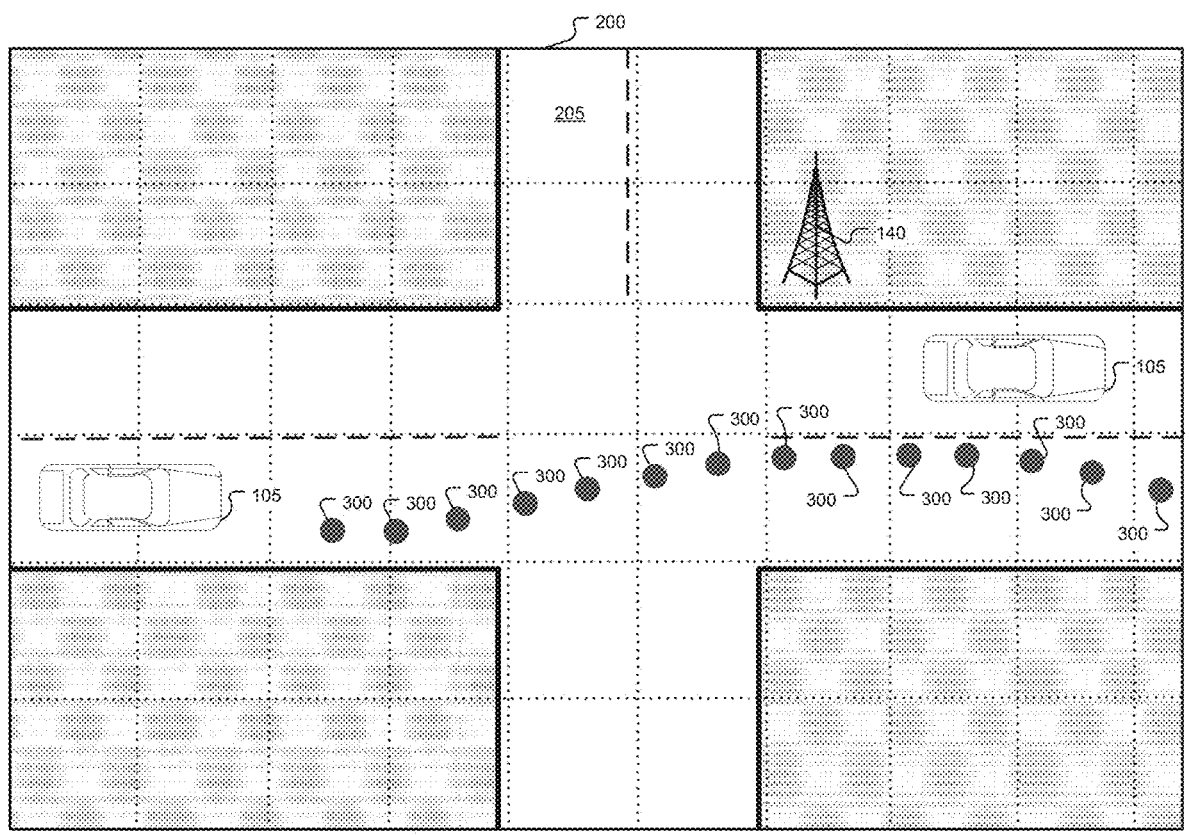
FIG. 5 is a block diagram illustrating an example area proximate to an infrastructure element including irregular objects.

Occupancy boxes are useful for objects that can be classified and assigned a regular shape such as a rectangle. FIG. 5 is a block diagram illustrating an example area 200 proximate to an infrastructure element 140 including irregular objects, i.e., construction barriers or cones 300. Even where objects are stationary or low a threshold speed, the computer 155 can classify objects as irregular because they are irregularly shaped or positioned with respect to a one another, as in the example of the cones 300.

Figure 6:
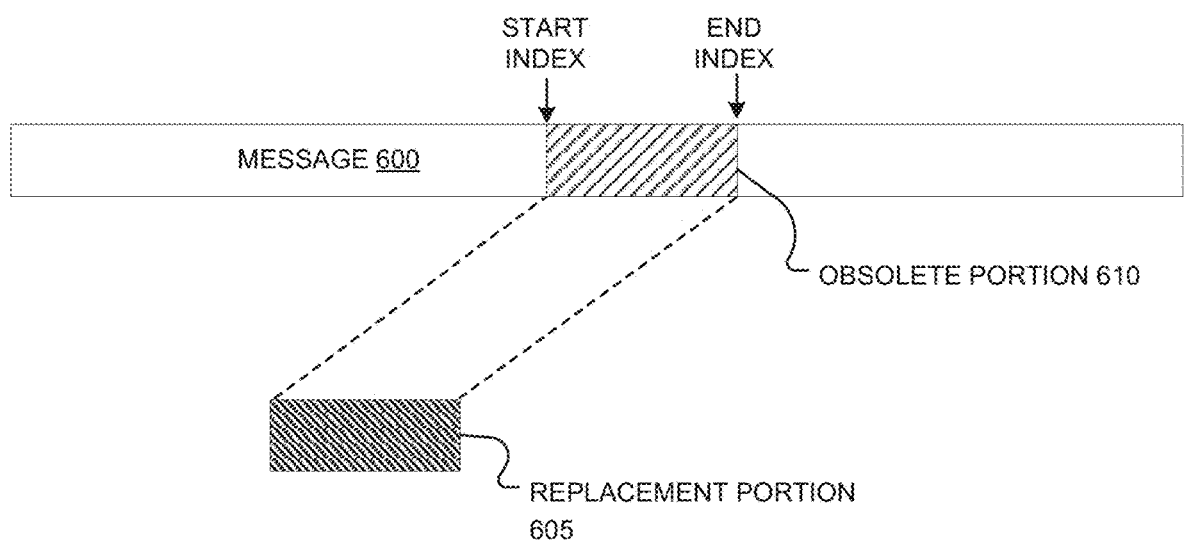
FIG. 6 is a block diagram illustrating a message replacement.

FIG. 6 is a block diagram illustrating a message 600 being provided with a replacement position 605 to replace an obsolete portion 610 of the message 600. The message 600 comprises one or more packets that together provide a serialized payload S. For example, the payload S could be an area map. That is, the message could include serialized data specifying coordinates for each sub-area 205 in an area 200 along with an occupancy status (i.e., occupied or unoccupied, TRUE or FALSE, one or zero, etc.) and/or characteristics, i.e., a physical description, of hazards and/or objects as described above. The computer 155 can be programmed to, after generating the area map, serialize the area map to provide the payload S for the message 600 which can then be sent, e.g., via the module 150.

The computer 155 can further be programmed to then identify changes in the area map for each sub-area 205 in the area 200. Upon determining a change in a sub-area 205, the computer 155 can modify the area map to reflect the change, e.g., a change in occupancy status, a change in an object in the sub-area 205, etc. To avoid retransmitting the entire area map and unnecessarily consuming valuable bandwidth, the computer 155 can further be programmed to provide the replacement portion 605 to replace a portion of the message 600 that is now an obsolete portion 610, i.e., because information about a sub-area 205 described in the obsolete portion 610 has changed. As explained further below, a packet header for the replacement portion 605 can specify a start index and an end index of message 600 packet(s) that the replacement portion 605 is to replace, i.e., a start index and an end index of the obsolete portion 610.

Prior to sending a message 600 or a replacement portion 605, the computer 155 can analyze available bandwidth needed to transmit a message, e.g., including an area map. For a set of serialized data S, let:

k=a size of S in bytes (i.e., k is a total number of bytes needed for the message payload);
r=a number of bytes reserved for a packet header;
$\alpha$=a current transmission rate in bytes per second, e.g., in the following equations a can represent transmitted data as bytes transmitted within a current second, and can be reset to be zero at the beginning of each second;
$\Omega$=maximum available bandwidth in bytes per second;
$\Phi$=maximum available payload (in bytes) for a single packet.

Based on the above, the computer 155 can make various determinations. The computer 155 can determine whether a payload (e.g., a message including S) can be accommodated in a single packet or needs to be divided into a plurality of sub-payloads, each for one of a plurality of message packets. This determination can be made by evaluating the following inequality:

$$k \leq \min\{\Omega-\alpha, \Phi\} - r \tag{1}$$

If inequality (1) evaluates to TRUE, then the payload S can be transmitted in a single packet. Otherwise, multiple packets are needed to transmit S. Further, inequality (1) can be used to determine a size and number sub-payloads, i.e., a minimum number n of sub-payloads Si is one, and a maximum number n of sub-payloads Si is given by:

$$n = roundup\left(\frac{k}{\min\{\Omega - \alpha, \Phi\} - r}\right) \tag{2}$$

ROUNDUP is a function that rounds up to the nearest whole number.

Other rules can be implemented in the computer 155 and/or module 150 to control a transmission, such pausing a transmission when the following evaluates to TRUE:

$$\alpha + r \geq \Omega \tag{3}$$

This inequality (3) is used to ensure a packet can carry at least the header data, and that meanwhile the transmission rate is within the specified bandwidth.

Each of one or more packets carrying a sub-payload Si can include a header with the fields shown in Table 1:

| Field | Definition |
| --- | --- |
| Certificate | A series of bytes that can be used to identify whether a message is broadcast by certified devices, e.g., according to conventional certificate techniques. |
| MessageID | Identifier for the message (typically randomly generated) |
| MessageType | Description of payload, e.g., hazard map, occupancy boxes, emergency broadcast, traffic signal notification, etc. |
| RegionSpecifier | A set of coordinate on a map specifying an occupancy box, i.e., an area to be indicated as occupied by an object. The occupancy box is typically rectangular and therefor the RegionSpecifier typically includes coordinates for corners of the rectangle, e.g., UpperRight, UpperLeft, LowerRight, LowerLeft. Could be NULL if no occupancy boxes are being provided in the message. |
| Number n of packets in the message | Total number of packets in the message to provide the payload S |
| Current packet index i | Index of the current packet |
| k | Total number of bytes needed for the message payload |

-continued

| Field | Definition |
|---|---|
| Current payload | Size (in bytes) of the current packet payload |
| Replacement flag | A binary value (e.g., TRUE/FALSE or 1/0) indicating that the message in which the packet is included is (i.e., if TRUE or 1) or is not (i.e., if FALSE or 0) is a replacement part for an earlier message, e.g., a replacement for a portion of an area map. |
| PriorMessageID | ID of the message to be modified, i.e., to have a part replaced by the message of which the current packet is a part (can be set to NULL if the current message is not a replacement message). |
| StartIndex | Start position or index in the message having a part replaced, i.e., where the replacement should begin (can be set to NULL if the current message is not a replacement message). |
| EndIndex | Start position or index in the message having a part replaced, i.e., where the replacement should begin (can be set to NULL if the current message is not a replacement message). |

Figure 7:
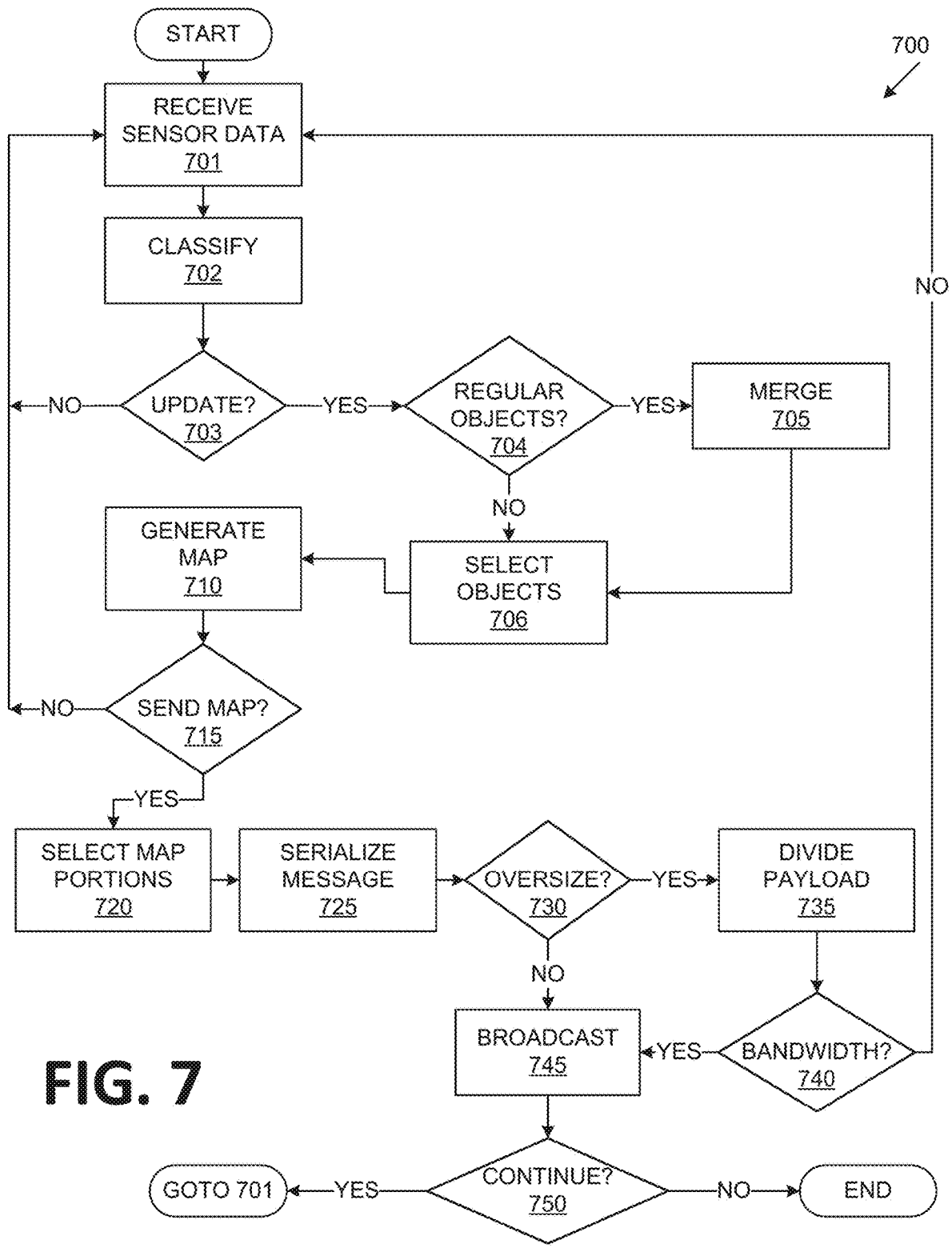
FIG. 7 is a flowchart of an exemplary process to generate and send an area map.

FIG. 7 is a flowchart of an exemplary process 700 that can be implemented in an infrastructure computer 155 to send messages 600 and/or replacement messages 605, e.g., to provide area maps to vehicles 105 proximate to an infrastructure element 140.

The process 700 begins in a block 701, in which the computer 155 receives data from sensors 145 about an area 200 around the infrastructure element 140. For example, the area 200 around the infrastructure element 140 could be defined as a proximate area, i.e., an area that is within a field of view of sensors 145.

Next, in a block 702, the computer 155 can classify detected objects in the area 200. For example, as discussed above, object detection and classification algorithms can identify an object as stationary or moving and/or as regularly or irregularly shaped. Further, in one example, an object can alternatively or additionally be classified as "virtually stationary" if it is moving below a predetermined rate of speed. For example, Equation (4) can be used to identify a virtually stationary object.

$$\Delta t = l/v \quad (4)$$

In Equation (4), l represents a length of sub-areas 205 in the area 200, v represents a velocity of the object, and the expression l/v therefore gives a value in time, i.e., $\Delta t$. Where $\Delta t$ is below a predetermined threshold, the object can be determined to be virtually stationary. In one example, where $\Delta t < 1$ second, the object can be deemed to be virtually stationary.

Next, in a block 703, the computer 155 determines whether to update an area map. Note that, in a first iteration of the process 700, the block 703 would be omitted, and the process 700 would proceed from the block 702 to the block 704. Otherwise, the computer 155 determines whether new objects have been detected in an area 200, previously-detected objects are now absent, and/or whether objects have moved, i.e., have remained stationary or virtually stationary, or have moved from a previously-mapped location as specified by map coordinates.

Further, the computer 155 can determine to update or not to update the map according to respective classifications of objects in the block 702. For example, the computer 155 could be programmed to update the map with different periodicities based on different classifications of objects. For example, a stationary or virtually stationary object could be specified to be updated on the map with a lowest level of priority, e.g., with a longest period, e.g., every 1 second, while slower moving objects, e.g., objects classified as pedestrians or bicycles could be updated on a map with a medium periodicity, e.g., every 0.1 seconds, whereas fast-moving objects such as vehicles 105 could be updated with a highest periodicity, e.g., every iteration of the process 700. In this example, the computer 155 would select to update a map for respective low, medium, and high periodicity objects if the respective period for the object had elapsed, and the object had elapsed.

If the map is not to be updated, then the process 700 returns to the block 702. Otherwise, the process 700 proceeds to a block 704.

In the block 704, the computer 155 determines whether detected objects in the area 200 include one or more regular objects. That is, if a detected object is stationary or virtually stationary, and can be bounded by an occupancy box 300 because the object is of a financially regular shape, then the computer 155 determines that one or more regular objects are detected, and proceeds to a block 705. Otherwise, the process 700 proceeds to a block 706.

In the block 705, the computer 155 identifies any distances D between occupancy boxes identified in the block 704, and, for occupancy boxes where the distance D is less than a predetermined threshold as discussed above, merges those occupancy boxes. The block 705 may be omitted if only one occupancy box is identified in the block 704.

In a block 706, which may follow either of the blocks 704, 705, the computer 155 selects objects to be included in the area map. For example, the computer 155 typically selects objects identified as triggering or warranting an update of the map as described above with respect to the block 703, as possibly described by occupancy boxes (including merged occupancy boxes. Further, selected objects can include one or more irregular objects (an example of which would be the cones 300 shown in FIG. 5) that are present in the received sensor data. Irregular objects cannot be represented by occupancy boxes, but rather must be specified according to coordinates on the area map along with information about whether the object is moving, distance from other objects, etc.

Next, in a block 710, the computer 155 generates an area map. For example, as explained above, the area map may be a set of data that describes sub-areas 205, each sub-area 205, e.g., a square or a rectangle, specified by latitude and longitude coordinates, the map further including, for each sub-area 205, an occupancy status, a description of an object, a velocity of an object, and/or other data pertaining to the sub-area 205. Alternatively or additionally, the map could specify, e.g., in a RegionSpecifier field, an occupancy box.

Next, in a decision block 715, the computer 155 determines whether to transmit the area map generated in the block 710. For example, the computer 155 could determine that bandwidth is not available or needs to be reserved for a higher priority message, e.g., an emergency broadcast message for vehicles 105 proximate to the infrastructure element 140, a traffic signal status notification that may be time-sensitive, etc. If the map is not to be sent, then the process 700 can return to the block 701. Otherwise, a block 720 is executed next.

In the block 720, the computer 155 selects portions of the area map generated in the block 710 to be transmitted. In this context, a portion of an area map means a set of data describing a specific sub-area 205, or could collectively mean data describing more than one specific sub-area 205, but less than all of the sub-areas 205 in the area 200 described by an area map. For example, the computer 155 could determine to transmit the entire area map in a message 600, e.g., because a threshold number, e.g., a majority, of sub-areas 205 in a previously sent map have obsolete data. Further, the computer 155 could determine to transmit a message 605 providing only portions of the map pertaining to sub-areas 205 for which data has changed. In the latter instance, the computer 155 can advantageously achieve lossless transmission of updated map data, whereas other techniques might involve using lossy compression to provide area map data including updated map data.

Next, in a block 725, the computer 155 serializes the area map, e.g., using known programming techniques, to encode the map as a payload S in a message 600, or portions of the map in a message 605.

Next, in a block 730, the computer 155 determines whether the payload S is oversized, i.e., whether multiple packets are required. For example, the computer 155 can use inequality (1) given above to determine whether the payload S can be provided in a single packet. If the payload S is not oversized, the computer 155 creates a single-packet message 600 or 605 that includes a header as described above regarding Table 1, and proceeds to the block 745. Otherwise, the process 735 proceeds to a block 735.

In the block 735, the computer 155 divides the payload S into n packets, e.g., as described above, e.g., using (2) above, creating a multi-packet message 600 or 605.

Following the block 735, in a decision block 740, the computer 155 determines whether sufficient bandwidth exists to send the message 600, 605, e.g., according to (3) above. If not, the process 700 returns to the block 701. Otherwise, the process 700 proceeds to the block 745.

In the block 745, the computer 155 actuates transmission, e.g., via the module 150, of the message 600, 605 created in one of the blocks 730, 740.

Following the block 745, in a block 750, the computer 155 determines whether the process 700 is to continue. For example, the process 700 could be terminated according to a time of day, available power to the infrastructure element 140, etc. The process 700 either ends or returns to the block 701 following the block 750.

Figure 8:
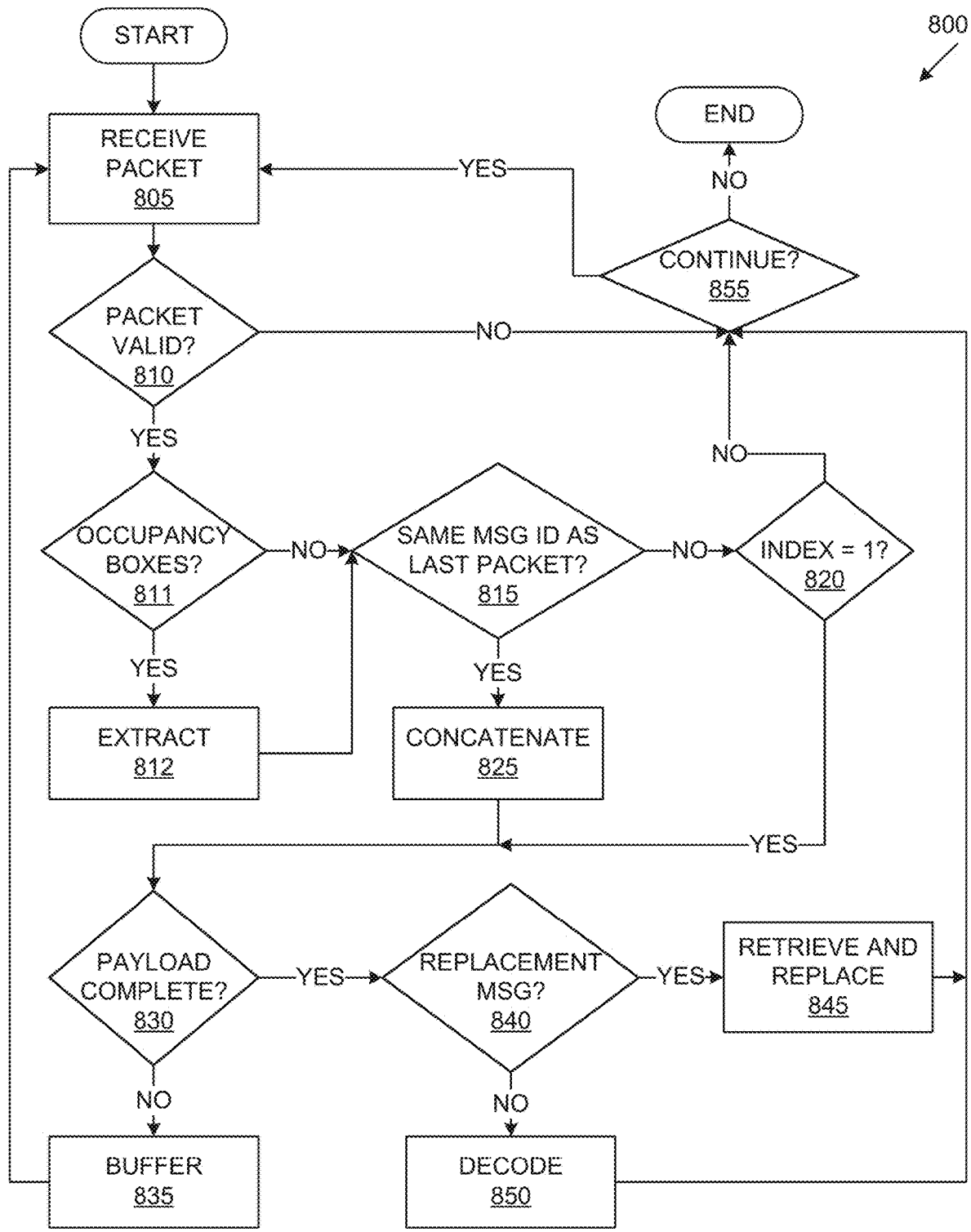
FIG. 8 is a flowchart of an exemplary process to receive and utilize and area map.

FIG. 8 is a flowchart of an exemplary process 800 that can be implemented in a vehicle computer 110 to receive messages 600/305 from an infrastructure element 140.

The process 800 begins in a block 805, in which the computer 110 receives a packet from an infrastructure element 140.

Next, in a decision block 810, the computer 110 determines whether the packet is valid, e.g., whether the packet includes recognizable header information. for example, the computer 110 could analyze a Certificate field in a packet header according to conventional techniques for analyzing and validating digital certificates. If the packet received in the block 805 is not valid, then the process 800 proceeds to a block 855. Otherwise, the process 800 proceeds to a block 811.

In the decision block 811, the computer 110 determines whether in occupancy box (or boxes) is present, e.g., whether a RegionSpecifier field is not NULL. If in occupancy box is specified in the message, then the process 800 proceeds to a block 812. Otherwise, the process 800 proceeds to a block 815.

In the block 812, the computer 110 extracts the occupancy box (or boxes) specified in the message, i.e., extracts the map coordinates specifying the occupancy box and hence specifying an area in the map to be indicated as occupied. Then the process 800 proceeds to the block 815.

In the decision block 815, the computer 110 determines whether the received packet has a same message ID as a last received packet. If no, the process 800 proceeds to a block 820. If yes, the process 800 proceeds to a block 825.

In the block 820, the computer 110 determines whether the packet header specifies an index value equal to 1. If yes, the process 800 proceeds to a block 830. Otherwise, the process 800 proceeds to the block 855.

In the decision block 825, the computer 110 concatenates the received packet with other packets in a message 600, 605 having a same identifier is determined in the block 815.

In the decision block 830, which may follow either of the blocks 820, 825, the computer 110 determines whether a message 600, 605 of which the current packet is a part is complete. As noted above, a packet header can specify a total number of packets for a message as well as a total payload size for a message. Using one or both of these data, for example, the computer 110 can determine whether the message 600, 605 is complete. If it is not, the process 800 proceeds to a block 835. Otherwise, the process 800 proceeds to a block 840.

In the block 835, the packet received in the block 805 is stored in a buffer, and the process 800 then returns to the block 805 to receive a next packet in a message 600, 605.

In the block 840, the computer 110 determines whether the message 600, 605 determined to be complete in the block 830 is a replacement message 605, e.g., according to a flagger indicator such as discussed with respect to Table 1 above. If yes, the process 800 proceeds to a block 845. If no, the process 800 proceeds to a block 850.

In the block 845, the computer 110 retrieves message 605 data from the buffer (if necessary), and decodes or deserializes the message 605 and, using start and end indexes in the message 605 packet header(s), inserts the message 605 in a previously-received message 600 to replace an obsolete portion 610 of the previously-received message 600. Alternatively or additionally, the computer 110 could replace an area of a stored map according to one or more occupancy boxes indicated in the message 605. The process 800 then proceeds to the block 855.

In the block 850, the computer 110 decodes or deserializes the message 600. The process 800 then proceeds to the block 855.

In the block 855, the computer 110 determines whether the process 800 is to continue. For example, a vehicle 105 and/or computer 110 could be powered off, the computer 110 could determine that the vehicle 105 is out of range of an infrastructure element 140 and/or that no data has been received from an infrastructure element 144 a specified period of time, etc. If the process 800 is to continue, the process 800 returns to the block 805. Otherwise, the process 800 ends.

Once the process 800 is complete (or in what could be thought of as an additional step), the vehicle computer 110 can use the area map, including any updates as described above, to operate the vehicle 105. For example, computer 110 path planning algorithms can incorporate whether a sub-area 205 is occupied or unoccupied in planning a path through an area 200, e.g., whether to actuate vehicle 105 components 120 such as braking, acceleration, and/or steering to avoid an object in a sub-area 205, or to travel through a sub-area 205 because the sub-area 205 is not occupied, etc.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor for: generating a map of an area describing an occupancy status for each of a plurality of sub-areas in the area, wherein the occupancy status for a sub-area specifies whether the sub-area is occupied or unoccupied by an object: transmitting a first message including the map with the occupancy status for each of the sub-areas: and transmitting a second message including an updated occupancy status for one or more of, and less than all, of the sub-areas, wherein the second message supplements the first message, thereby efficiently utilizing available bandwidth.

2. The system of claim 1, the instructions further including instructions for serializing the map to provide a payload for the first message.

3. The system of claim 1, wherein the area is defined by a field of view of a sensor on a stationary infrastructure element, and the map is generated from data from the sensor.

4. The system of claim 3, the instructions further including instructions for excluding a sub-area from the map based on expected paths of travel of vehicles in the area.

5. The system of claim 3, further comprising the stationary infrastructure element, wherein the computer and the sensor are fixed to the stationary infrastructure element.

6. The system of claim 1, wherein the second message includes data specifying a location in the first message for replacing a portion of the first message.

7. The system of claim 1, wherein the occupancy status is specified by an occupancy box that includes coordinates describing a shape of the occupancy box.

8. The system of claim 1, wherein the occupancy status is specified by a description of an object, including coordinates of the object and a motion status of the object.

9. The system of claim 1, the instructions further including instructions for determining to transmit the second message according to a priority assigned to updating the occupancy status of at least one of the plurality of sub-areas.

10. A computer comprising a processor and a memory, the memory storing instructions executable by the processor for: receiving a first message including a map of an area describing an occupancy status for each of a plurality of sub-areas in the area: wherein the occupancy status for a sub-area specifies whether the sub-area is occupied or unoccupied by an object: and receiving a second message, and determining that the second message includes one of a new map of the area and an updated occupancy status for one or more of, and less than all, of the sub-areas, wherein the second message supplements the first message, thereby efficiently utilizing available bandwidth.

11. A method, comprising: generating a map of an area describing an occupancy status for each of a plurality of sub-areas in the area, wherein the occupancy status for a sub-area specifies whether the sub-area is occupied or unoccupied by an object: transmitting a first message including the map with the occupancy status for each of the sub-areas: and transmitting a second message including an updated occupancy status for one or more of, and less than all, of the sub-areas, wherein the second message supplements the first message, thereby efficiently utilizing available bandwidth.

12. The method of claim 11, further comprising serializing the map to provide a payload for the first message.

13. The method of claim 11, wherein the area is defined by a field of view of a sensor on a stationary infrastructure element, and the map is generated from data from the sensor.

14. The method of claim 13, further comprising excluding a sub-area from the map based on expected paths of travel of vehicles in the area.

15. The method of claim 11, wherein a computer and a sensor are fixed to a stationary infrastructure element.

16. The method of claim 11, wherein the second message includes data specifying a location in the first message for replacing a portion of the first message.

17. The method of claim 11, wherein the occupancy status is specified by an occupancy box that includes coordinates describing a shape of the occupancy box.

18. The method of claim 11, wherein the occupancy status is specified by a description of an object, including coordinates of the object and a motion status of the object.

19. The method of claim 11, further comprising determining to transmit the second message according to a priority assigned to updating the occupancy status of at least one of the plurality of sub-areas.

* * * * *

UNITED STATES PATENT AND TRADEMARK OFFICE
CERTIFICATE OF CORRECTION

PATENT NO. : 10,841,761 B2  
APPLICATION NO. : 16/134485  
DATED : November 17, 2020  
INVENTOR(S) : Linjun Zhang et al.

Page 1 of 1

It is certified that error appears in the above-identified patent and that said Letters Patent is hereby corrected as shown below:

In the Claims

Column 15, Line 13, replace "object:" with "--object;--"

Column 15, Line 14, replace "sub-areas:" with "--sub-areas;--"

Column 16, Line 2, replace "area:" with "--area;--"

Column 16, Line 4, replace "object:" with "--object;--"

Column 16, Line 14, replace "object:" with "--object;--"

Column 16, Line 15, replace "sub-areas:" with "--sub-areas;--"

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*